United States Patent [19]
McCool

[11] Patent Number: 5,648,940
[45] Date of Patent: Jul. 15, 1997

[54] PULSE CODED SONAR HAVING IMPROVED DOPPLER DETERMINATION FEATURE

[75] Inventor: John M. McCool, Altadena, Calif.

[73] Assignee: The United States of America as represented by the Secretary of the Navy, Washington, D.C.

[21] Appl. No.: 701,812

[22] Filed: Jan. 23, 1968

[51] Int. Cl.$^6$ .................................................. G01S 15/00
[52] U.S. Cl. .................................................. 367/90; 367/131
[58] Field of Search .......................... 340/3, 3 D; 343/8; 367/90, 131

[56] References Cited

U.S. PATENT DOCUMENTS

| | | | |
|---|---|---|---|
| 3,046,545 | 7/1962 | Westerfield | 342/189 |
| 3,158,830 | 11/1964 | Clay, Jr. | 367/100 |
| 3,167,738 | 1/1965 | Westerfield | 367/90 |
| 3,183,478 | 5/1965 | Slawsky et al. | 367/5 |
| 3,290,649 | 12/1966 | Whitehouse | 340/146.2 |
| 3,302,162 | 1/1967 | Rowlands | 367/90 |

*Primary Examiner*—Ian J. Lobo
*Attorney, Agent, or Firm*—Harvey Fendelman; G. J. Rubens; M. F. Oglo

[57] ABSTRACT

The signal appearing at the receiver input of a pulse code active sonar during a return echo period, is sampled, time compressed and stored in a memory. The time compressed sample is successive read-out of memory, with each individual "read-out" hetrodyned with a discretely different doppler compensation frequency signal. The successively processed read-outs are passed through an "on line" correlation detection device to determine presence of a correctly compensated pulse code echo.

2 Claims, 2 Drawing Sheets

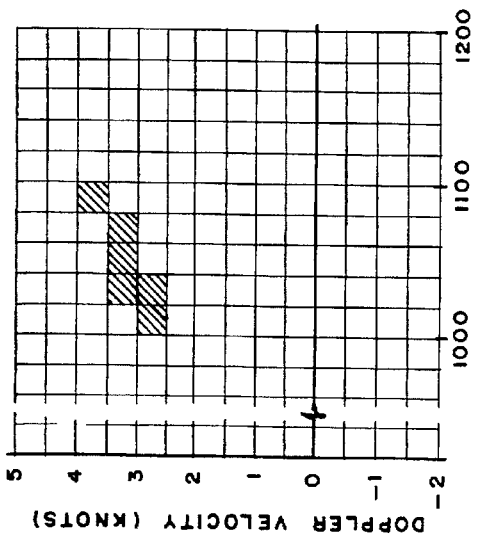
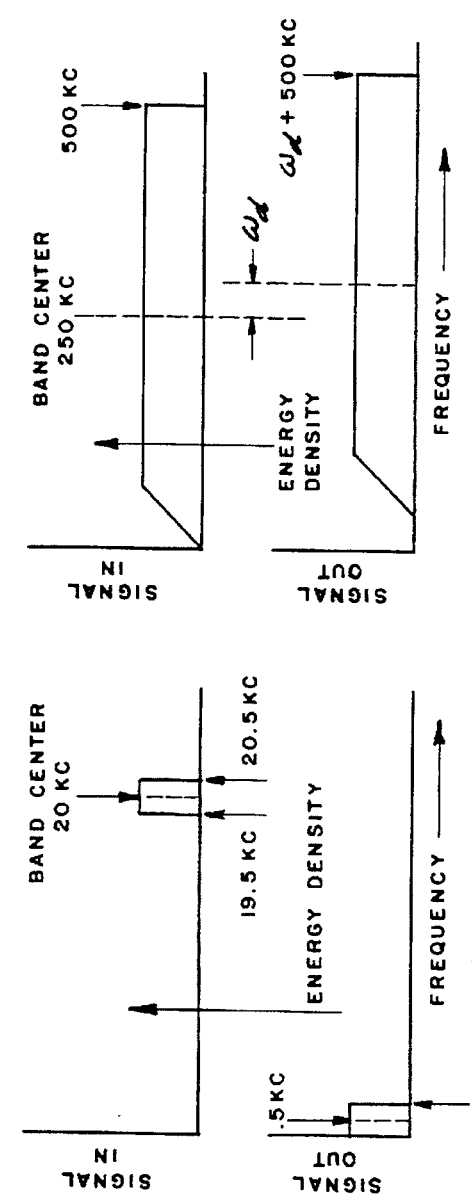
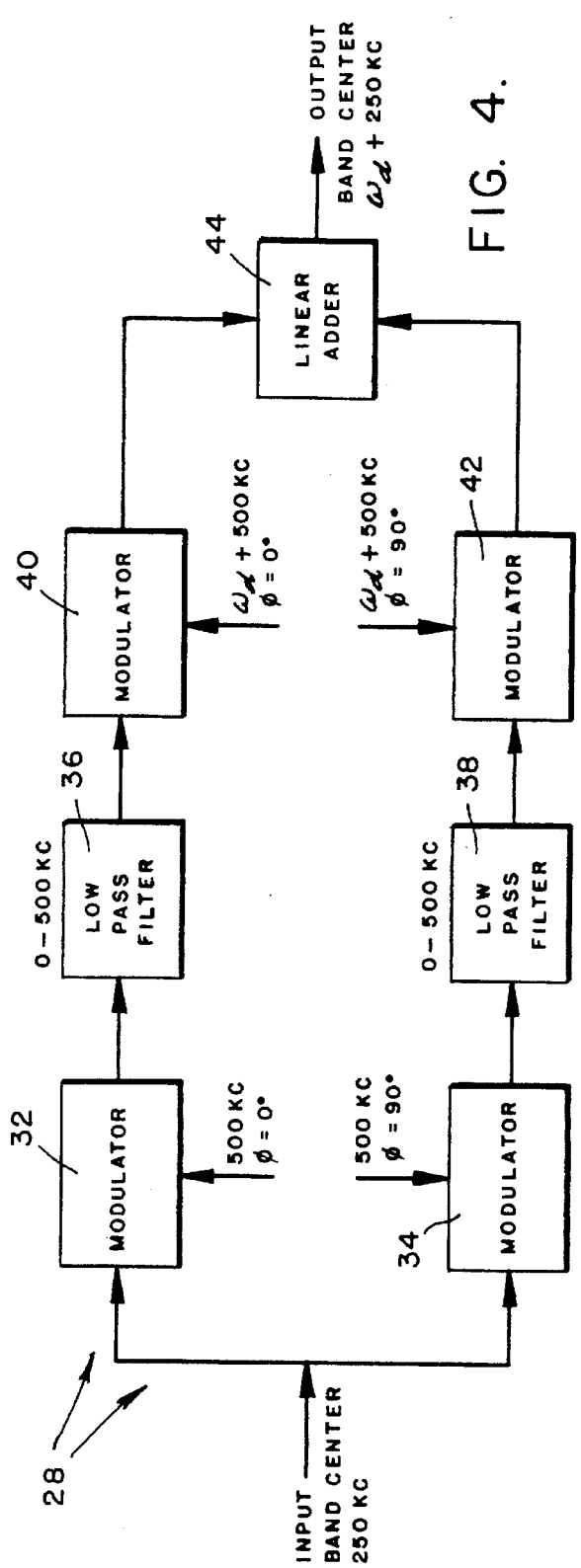

PULSE CODED SONAR HAVING IMPROVED DOPPLER DETERMINATION FEATURE

Background of Invention

This invention relates to an improved method and apparatus for processing sonar pulse code echoes for determining the doppler of a return echo.

A known prior art approach for processing sonar pulse codes for determining the doppler of such return echo is the use of a complex of parallel filter channels. One filter channel is needed for each desired increment of doppler determination. An example of such a system is disclosed in U.S. Pat. No. 3,302,162, R. O. Rowlands, entitled "Doppler Sonar Apparatus". The complexity and size of filter bank structure which would be needed to provide a large multiplicity of channels make this approach impractical for fine doppler resolution applications.

Accordingly, the objectives of the invention include provision of:

(1) An improved method and apparatus for processing sonar pulse code echoes to determine the doppler of a return echo with a high degree of resolution.

(2) An improved method and apparatus in accordance with the preceding objective which is further adaptable to operate in a mode of operation providing range determination with a high degree of resolution.

(3) An improved method and apparatus for processing sonar pulse code echoes in accordance with the preceding objective, and which may be implemented by a construction which is sufficiently compact for use in the smaller type acoustic torpedoes, such as are launched from aircraft.

Other objects and many of the attendant advantages of this invention will be readily appreciated as it becomes better understood by reference to the description and accompanying drawing which follows.

Brief Description of the Drawing

FIGS. 2 and 3 are frequency translation diagrams illustrating operation occurring in the system of FIG. 1;

FIG. 4 is a more detailed block diagram of a component of the system of FIG. 1; and FIG. 5 illustrates how a cathode ray tube presentation of a doppler vs. range grid system appears during presence of a submarine target in a preferred mode of operation of the system of FIG. 1.

Detailed Description of the Preferred Embodiment

Figure 1:
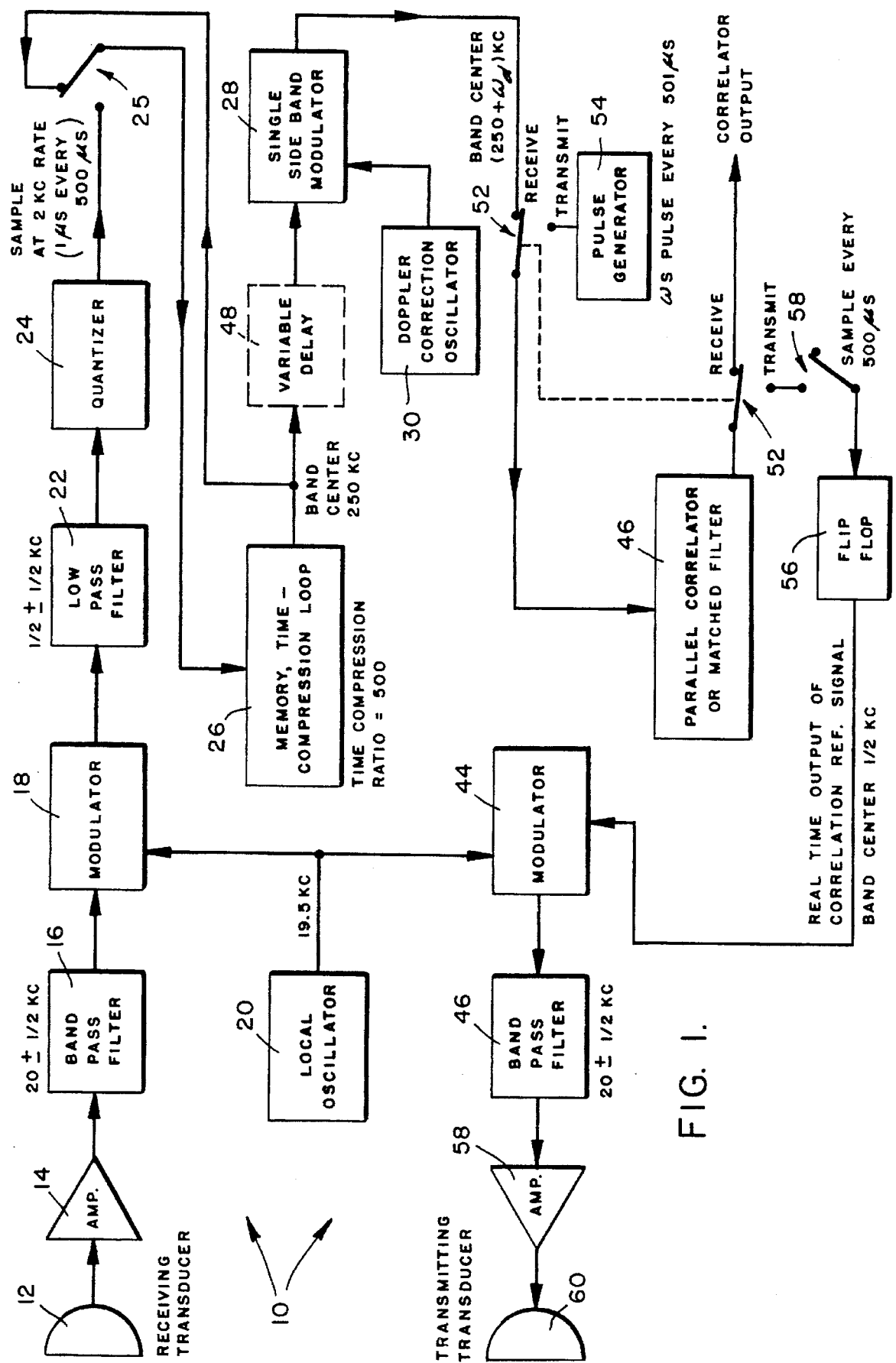
FIG. 1 is a block diagram of a pulse code sonar system embodying the present invention.

Referring now to the drawing and in particular to FIG. 1, there is shown a block diagram of a correlation-replica sonar system 10, which further serves as a special purpose processor for estimating target doppler. The input of system 10 is a receiving transducer 12 which transforms the acoustic energy into an electrical signal. This passes through an amplifier 14 which raises the electrical level of the signal and then passes it to a band pass filter 16 which restricts the bandwidth of the system to the region of interest. For purposes of clarity, illustrative values for band center frequencies, bandwidths, data sampling rates, etc., are shown by legend on the drawing. The output of the band pass filter, a 1 kc region centered at 20 kc, enters a modulator 18 where it is heterodyned against a local oscillator 20, operated at 19½ kc. As shown by the frequency translation diagram of FIG. 2, this transforms the 20±½ kc signal band to a 1 kc region centered at ½ kc.

After passing through a low pass filter 22, the signal enters a digital quantizer 24 and is sampled by an electronic sampling switch 25 at a rate of 2 kc which satisfies the sampling rate requirement of information theory. The order of quantization is determined entirely by the quantization error that will be allowed in the entire system. Axis crossing, otherwise known as two state digital quantization was employed in a highly successful operated embodiment. The quantized output is stored in a combination memory and time-compression loop 26. A typical device for performing this operation would be the type of memory system and time compressor disclosed in U.S. Pat. No. 3,093,796 to E. C. Westerfield entitled "Automatic Signal Time Compressor with Gate Means for Controlling Rate of Shift Register Output". If it is assumed that the time compression ratio of memory and time-compression loop 26 is 500, its output would be its input signal compressed by a factor of 500 in time. The original 500 cycle band center of real time input would appear at the output at 250 kc. This signal is presented to a single side band modulator 28 whose purpose is to offset the spectrum by the frequency $\omega_d$ of a local doppler correction oscillator 30, in order to provide the hetrodyne portion of a doppler correction.

FIG. 3 shows the transfer function of modulator 28. Its output is the input spectrum shifted by the frequency of doppler correction oscillator 30.

A possible implementation of a single side band modulator 28 for this system is illustrated in FIG. 4. The input signal, which in this system is the output of the memory and time-compression loop 26, is applied to a pair of balanced modulators 32 and 34, both of which are driven by a 500 kc local oscillator. To provide inversion of spectrum, the upper modulator 32 is driven at zero phase while the lower modulator 34 is driven in quadrature with the upper oscillator. Upper and lower filters 36 and 38 pass the lower side banks which are respectively, the original spectrum inverted, and the original spectrum inverted and shifted 90°. These two signals are applied to another pair of modulators 40 and 42. The upper modulator 40 is driven by doppler correction oscillator 30 at the doppler frequency $\omega_d$ plus 500 kc at zero phase, and the lower modulator is driven at the doppler frequency plus 500 kc but at 90°phase. The outputs of these two modulators are filtered and added linearly in an adder 44 to form the output which will be the input spectrum shifted by the doppler frequency $\omega_d$. For further details of this type of broad band modulator reference is made to the article entitled "A Third Method of Generation and Detection of Single-Sideband Signals," by Donald K. Weaver, Jr., Proceedings of the IRE, December 1956 page 1703.

Doppler correction oscillator 30 has been described as though its output was a single frequency, $\omega_d$ plus 500 kc. In an actual operational embodiment the sample and compressed return echo is successively hetrodyned against a series of different $\omega_d$'s at a high data processing rate in order to scan for a graduated series of different dopplers. A suitable master timing scheme operates in conjunction with the automatically sequenced correction oscillator in order to enable time domain identification of the specific doppler for which compensation is being made.

The output of the single side band modulator 28 is applied to a "parallel correlator" or matched filter 46 for on-line detection of the time compressed version of the sonar pulse code. A suitable device of this type is disclosed in U.S. Pat.

No. 3,290,629 to H. J. Whitehouse, entitled "Delay Line Signal Detector". The transfer function of such a device is the cross correlation of the signal passing therethrough and a correlation reference corresponding to the time compressed version of the sonar pulse code unmodified by any doppler. When the input to system 10 contains a return echo modified by doppler, application of the appropriate $\omega_d$ from doppler correction oscillator 30 will translate it back to the unmodified version before passing through matched filter 46. Thus, presence of indication of correlation at the output of matched filter 46 indicates presence of a return echo having a doppler corresponding to the $\omega_d$ which was applied. Note that the output of the parallel correlator 46 is obtained at compressed time rate rather than at a real time rate, thus enabling the system to sequentially process a large number of dopplers and ranges (frequency and time increments) during the available period inherent to the pulse cycle of a sonar.

In the time compression of echo signals there are situations where the higher frequencies should be shifted more than the lower frequencies. Such conditions occur when a wide bandwidth reference signal is used in the correlator 46 and the target has large doppler velocity, i.e., the range change of the target during the time interval of a single transmission is large relative to the range resolution of the correlator's output. An approximate compression or extension term of an exact doppler correction may be implemented by inserting a variable delay 48 (shown in a dashed line box) between the memory and time-compression loop 26 and the single side band modulator 28. The rate of change of this delay is made directly proportional to the doppler correction frequency $\omega_d$. This delay has been implemented by changing taps on shift registers or by using lumped-constant delay lines containing non-linear inductors and capacitors.

If it is desired that the acoustic signal to be transmitted from the system's transmitting transducer 50 be the same as the reference stored in the correlator 46, it can be obtained from the correlator as a real time output. In FIG. 1, a method of obtaining a real time output from a parallel correlator or matched filter is illustrated. Advantage is taken of the principle that the impulse response of a matched filter is simply the time function that the filter is matched to, running backwards in time. (A discussion of this principle is found in the textbook "Random Signals and Noise," by Davenport and Root, McGraw Hill, 1958, page 244.) To obtain a real time output running forward in time from a matched filter whose reference is the desired signal at a compression ratio of 500, the filter is switched by the system's transmit-receive switch 52 to be driven by a pulse generator 54 with pulses at an interval of 501 microseconds. This produces an output which is the desired signal, time compressed by a factor of 500, but running backwards in time. To invert this signal in time and to reduce it to a real time rate, a sample of the output of the matched filter is taken into a flip flop 56 every 500 microseconds by a sampling switch 58. Its output is the real time replica of the signal stored in the correlator 46. The output of flip flop 56 is hetrodyned by a modulator 44 from the 0-1 kc band to the 20±½ kc band, and amplified by power amplifier 58, can be presented either to the transmitting transducer 60 or to the receiving transducer reconnected for transmission.

The high speed data processing technique just described is well suited for submarine detection and surveillance applications. It permits a rugged high capacity correlation system to be packaged within the volume constraints of small, aircraft torpedoes and permits detection and classification functions to be performed under their respective more favorable conditions. It also permits elaborate active sonar correlation data processing to be utilized in small buoy type vehicles either moored, towed, or free running.

For example, a 20 kc sine wave of ⅓ second duration could be utilized as the transmitted (reference) signal for use against a moving target. This would provide a doppler resolution of approximately 0.25 knots with the illustrative signal end signal channel parameters shown by legend on the drawing. The excellent frequency (doppler velocity of target) resolution capability of system 10 and its large data processing capability act in combination to permit rapid search of many velocity increments. This provides high probability of detection of a moving target even under low signal-to-noise conditions. After a target has been detected, a code having a high time (range) resolution capability could be used to obtain accurate target range information. One such code can be obtained by using a 400 cycle wide band of noise, and such a code has been found to provide range resolution as fine as 2 yards. The doppler and range information may be displayed as a cathode ray tube image having grid system in which one of the co-ordinates represents doppler and the other represents range. FIG. 5 illustrates such a display. The shaded grids represent doppler and range increments for which the matched filter 46 indicated occurrence of correlation. Such a display is effective for both classifying a target and for tactical usage. For example, the display in FIG. 5 is for a positive doppler velocity indicating that the target is approaching the sonar equipment. The velocity of the target is greater at the longer range (stern approaching faster than the bow) thus indicating that it is making a turn. If the target's extent in range exceeded that of a submarine, it should be classified as a false target. If its doppler velocity were not consistent in neighboring range cells, the target might be a school of fish. If the target maneuvered (changed its doppler velocity) at a rate exceeding the capability of a submarine, it might be classified as a whale.

The high speed sonar data processor of the present invention can be implemented by constructions small enough to fit within the space available for detection electronics within a small acoustic torpedo. Thus, such a torpedo may be provided with sufficient data processing capability to scan small range and doppler increment in real time, with both target detection and target classification logic performed on the results. This is a capability that no acoustic torpedo now possesses.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. For use in connection with a broad-band, pulse code sonar, the method of processing pulse code echoes to determine the doppler of a return echo; comprising the steps of:

(a) sampling and time compressing the signal during return echo periods, (b) storing the time compressed sample, (c) successively reading out the time compressed sample and hetrodyning each successive read-out with a discretely different doppler compensation frequency signal, and (d) passing the successively hetrodyned read-outs through an "on line" correlation detection device for detecting a correctly compensated pulse code echo.

2. Apparatus for use in connection with the broad-band, pulse code sonar technique of submarine surveillance; said apparatus comprising:

(a) means for sampling and time compressing the signal during return echo periods, (b) means for storing the time compressed sample, (c) means for successively reading out the time compressed sample and hetrodyning each successive read-out with a discretely different doppler compensation frequency signal, and (d) correlation detection means for detecting a correctly compensated pulse code echo in said succession of differently hetrodyned read-outs.

* * * * *